(12) United States Patent
Spazio

(10) Patent No.: US 11,298,998 B2
(45) Date of Patent: Apr. 12, 2022

(54) SUSPENSION ASSEMBLY FOR A VEHICLE AXLE

(71) Applicant: Carraro S.p.A., Campodarsego (IT)

(72) Inventor: Andrea Spazio, Rovigo (IT)

(73) Assignee: CARRARO S.P.A., Campodarsego (IT)

( * ) Notice: Subject to any disclaimer, the term of this patent is extended or adjusted under 35 U.S.C. 154(b) by 0 days.

(21) Appl. No.: 16/754,441

(22) PCT Filed: Oct. 10, 2018

(86) PCT No.: PCT/IB2018/057844
§ 371 (c)(1),
(2) Date: Apr. 8, 2020

(87) PCT Pub. No.: WO2019/073402
PCT Pub. Date: Apr. 18, 2019

(65) Prior Publication Data
US 2020/0338945 A1     Oct. 29, 2020

(30) Foreign Application Priority Data

Oct. 10, 2017   (IT) ........................ 102017000113851

(51) Int. Cl.
*B60G 9/02*     (2006.01)
*B60G 13/08*    (2006.01)

(52) U.S. Cl.
CPC .............. *B60G 9/027* (2013.01); *B60G 13/08* (2013.01); *B60G 2200/324* (2013.01);
(Continued)

(58) Field of Classification Search
CPC .. B60G 9/027; B60G 13/08; B60G 2200/324; B60G 2200/34; B60G 2200/422; B60G 2204/423; B60G 2204/45
See application file for complete search history.

(56) References Cited

U.S. PATENT DOCUMENTS

| | | | |
|---|---|---|---|
| 1,383,203 A * | 6/1921 | Hartsock | B60G 9/00 280/124.11 |
| 5,236,061 A | 8/1993 | Haupt | |

(Continued)

FOREIGN PATENT DOCUMENTS

| | | | |
|---|---|---|---|
| DE | 690821 | 10/1941 | |
| EP | 0063370 A2 * | 10/1982 | B60G 3/26 |

(Continued)

OTHER PUBLICATIONS

International Search Report and Written Opinion dated Feb. 13, 2019 for PCT Application PCT/IB2018/057844.

*Primary Examiner* — Paul N Dickson
*Assistant Examiner* — Kurtis Nielson
(74) *Attorney, Agent, or Firm* — Stradley Ronon Stevens and Young, LLP

(57) ABSTRACT

A suspension assembly for a vehicle axle. The assembly comprises a support structure, a housing element rotatably connected, about a transverse axis, to a support element in which the support structure is configured in a such a manner that it can rotate in relation to the support element about the longitudinal axis of the vehicle and is secured to the main chassis of the vehicle by a pair of hydraulic cylinders. The support structure comprises a pair of main guides, which can be fixed to the main chassis and a rolling element which slides between the pair of main guides and a contact element with a pair of further guides, the contact element operatively associated with the pair of further guides so as to come into contact with one of the further guides following a rotation about the rolling element.

19 Claims, 7 Drawing Sheets

(52) U.S. Cl.
CPC .... *B60G 2200/34* (2013.01); *B60G 2200/422* (2013.01); *B60G 2204/423* (2013.01); *B60G 2204/45* (2013.01); *B60G 2300/08* (2013.01)

(56) References Cited

U.S. PATENT DOCUMENTS

| | | | | | |
|---|---|---|---|---|---|
| 5,447,321 | A | * | 9/1995 | Hurlburt | B60G 9/02 |
| | | | | | 180/266 |
| 5,879,016 | A | * | 3/1999 | Altherr | B60G 9/027 |
| | | | | | 280/124.112 |
| 6,056,304 | A | * | 5/2000 | Brambilla | B60G 9/02 |
| | | | | | 180/358 |
| 6,299,188 | B1 | | 10/2001 | Pertusi et al. | |
| 7,644,942 | B2 | * | 1/2010 | Bordini | B60G 9/022 |
| | | | | | 280/124.112 |
| 8,517,394 | B2 | * | 8/2013 | Pfiffner | B60G 9/02 |
| | | | | | 280/5.514 |
| 10,703,409 | B2 | * | 7/2020 | Umemoto | B62D 7/163 |
| 2006/0038371 | A1 | * | 2/2006 | Bordini | B62D 9/00 |
| | | | | | 280/124.113 |
| 2008/0231011 | A1 | * | 9/2008 | Bordini | B60G 9/022 |
| | | | | | 280/124.112 |
| 2009/0033068 | A1 | * | 2/2009 | Fischer | B60G 9/02 |
| | | | | | 280/678 |
| 2010/0244394 | A1 | | 9/2010 | Matsuzaki et al. | |
| 2017/0120706 | A1 | * | 5/2017 | Vescovini | B60G 21/05 |
| 2017/0369097 | A1 | * | 12/2017 | Umemoto | A01B 69/007 |

FOREIGN PATENT DOCUMENTS

| | | | |
|---|---|---|---|
| EP | 1972471 | 9/2008 | |
| FR | 2517606 A1 * | 6/1983 | ........... B60G 15/062 |
| FR | 2937904 | 5/2010 | |

* cited by examiner

SUSPENSION ASSEMBLY FOR A VEHICLE AXLE

CROSS REFERENCE TO RELATED APPLICATIONS

This application is a U.S. National Phase filing of International Patent Application No. PCT/IB20181057844 filed on Oct. 10, 2018, which claims the priority of Italian Patent Application No. 102017000113851 filed on Oct. 10, 2017. The disclosures of these applications are hereby incorporated by reference in their entirety.

DESCRIPTION

Technical Field

This invention relates to a suspension assembly for a vehicle axle, in particular, an agricultural vehicle or other similar vehicle suitable for off-road use. More specifically, the invention relates to a suspension assembly for a front axle, wherein the axle as a whole can move in relation to a vehicle chassis.

TECHNICAL BACKGROUND

Within the scope of the technical reference sector, various solutions are known which foresee the use of so-called suspended axles, namely suspension systems which allow for the support of the axle and for a certain freedom of motion of the axle in relation to the vehicle chassis.

Typically, in solutions of this kind, the axle is primarily supported on the chassis by the hydraulic cylinders of the suspension and of a support arm which can oscillate in relation to the vehicle chassis and in relation to which the axle can rotate about a longitudinal axis of the vehicle itself.

An example of this solution is described in U.S. Pat. No. 8,517,394 and U.S. Patent Application Publication No. 2010/0244394 or in European Patent No. EP 1 972 471.

In order to secure the axle, thus limiting its lateral motions perpendicular to the longitudinal axis of the vehicle, the solution described in U.S. Pat. No. 8,517,394 foresees the use of a wheel that protrudes longitudinally from the axle, secured in a guide. This securing solution allows for vertical motion and axle rotations about the aforementioned protruding wheel which are absorbed and inhibited by hydraulic cylinders for the purpose of optimizing driving comfort and quality when used on irregular terrain.

According to a further embodiment described in U.S. Pat. No. 8,517,394, the aforementioned hydraulic cylinders are intended, while substantially maintaining the axle in a vertical untilted position, to make the vehicle pass from a lowered chassis position in relation to the terrain and the wheels, to a raised chassis position that allows the wheels to further tilt in relation to the terrain without coming into contact with any part of the chassis itself or with any eventual wheel cover. Therefore, the functions of the hydraulic cylinders that are described are those of absorbing or cancelling out the oscillations of the axle and/or of maintaining the axle in a constant central position (especially during use in the raised position).

Therefore, the axle, being linked to the hydraulic cylinders that absorb oscillations, has a specific limited degree of mobility that makes it partially suitable for use in vehicles intended to be used off-road.

However, the aforementioned axle is not very suitable for use on particularly irregular terrain due to the presence of the hydraulic cylinders that absorb oscillations.

SUMMARY OF THE INVENTION

The technical problem which is at the basis of this invention is that of supplying a suspension assembly for a vehicle axle, in particular for agricultural vehicles or other similar vehicles, suitable for off-road use, which makes it possible to at least partially remedy one or more disadvantages mentioned above with reference to the prior art.

Moreover, a purpose of this invention is to supply a suspension assembly for a vehicle axle which allows for efficient mobility and control, but which, however, contemporaneously provides adequate sturdiness and protection from excessive axle oscillations and stress.

Moreover, a further purpose of this invention is to supply a suspension assembly for a vehicle axle that can best adapt to the irregularities of the terrain, maintaining the structural integrity of the vehicle itself unaltered while driving.

Furthermore, a purpose of this invention is to supply a suspension assembly for a vehicle axle that has a structure that can easily be made and installed and that, at the same time, is reliable for use in vehicles intended for off-road use.

This problem is solved and such purposes are fulfilled by the suspension assembly for a vehicle axle made according to this invention, comprising a support structure for an axle, a housing element for a driveshaft, the housing element being rotatably connected, about an axis that is perpendicular to the longitudinal axis of the vehicle, to a main chassis of the vehicle at one of its first extremities, the support structure being rotatably connected to the housing element about an axis that is substantially parallel to the longitudinal axis of the vehicle and being secured to the main chassis of the vehicle by a pair of hydraulic cylinders and comprising a pair of main guides, which can be secured to the main chassis, and a rolling element which slides between the pair of main guides.

The suspension assembly comprises a contact element, secured to the support structure and a pair of further guides, which can be fixed to the main chassis, with the contact element being operatively associated with the pair of further guides so as to come into contact with one of the further guides following a rotation about the rolling element.

The axle according to this invention allows for sufficient mobility for the wheels of the vehicle, therefore allowing it to proceed over rough terrain in an optimum manner, with a sturdy structure that protects the parts responsible for the movement of the axle in case of excessive motion or stress. Advantageously, the use of a contact element associated with a further pair of linear guides, with which the contact element comes into contact following an oscillation of the axle, allows for the limitation in an opportune manner of the rotational motion of the axle, while however permitting the vertical movement and oscillation. In this way, the structure is strengthened without compromising the mobility and control of the axle.

According to one embodiment, the main guides and the further guides are straight and are, in use, substantially vertical.

In this manner it is possible to optimize the compactness of the structure, obtaining an ideal possibility of movement of the rolling element and of the contact element according to a direction of purely vertical translation. This configuration is appropriate to effectively respond to substantially symmetrical variations of the incline of the terrain with respect to the longitudinal axis of the vehicle.

In one embodiment, the rolling element and the contact element are both disc-shaped, preferably having the same diameter.

Thanks to this technical measure, it is possible to have surfaces that are in contact with the pair of main guides and the pair of further guides which have no sharp edges and which allow for an excellent response both in terms of vertical translation and of rotation about an axis that is parallel to the longitudinal axis of the vehicle, thereby allowing the suspension assembly to adapt well to the various possible inclinations of the axle in relation to the terrain.

According to an embodiment, the further guides have a distance between each other that is greater than the distance between the main guides.

In this manner it is possible to optimally define a translational and rotational space wherein horizontal movement of the contact element in relation to the rolling element is allowed, which allows for better adaptation and control upon inclination of the axle with respect to the terrain and to the main chassis.

Preferably, the further guides extend as extensions of the main guides.

By this technical solution, the suspension assembly can be made more compact, minimizing the space it occupies.

According to an embodiment, the contact element is located beneath the rolling element in relation to the rotational axis of the support structure.

Thanks to this technical measure, an optimal vertically aligned arrangement of the axle and of the rolling and contact elements is achieved during configurations without inclination of the terrain (when the terrain is flat or with irregularities that are symmetrical with respect to the vertical axis of the axle).

Preferably, the suspension assembly further comprises at least one stop element which can be fixed to the main chassis and configured in such a manner that it comes into contact with the support structure following a vertical motion.

In this manner it is possible to define a maximum vertical motion accepted by the axle in relation to the main chassis, thus avoiding possible damages due to excessive motion and/or deformation of parts interconnected thereto.

According to an embodiment, the further guides are joined at one of their lower extremities by a reinforcing crossbar, increasing the stability and rigidity of the structure responsible for housing and securing the rolling element and the contact element, furthermore providing a further, lower contact element that limits the movement of the contact element, thus avoiding potentially excessive and potentially damaging motion. Moreover, this feature is particularly advantageous if it is adopted in combination with the placement of the contact element beneath the rolling element as previously indicated.

Preferably, the rolling element and the contact element are located at an extremity which is opposite to the housing element.

In this manner, it is possible to optimize the space used by the suspension assembly, guaranteeing excellent functioning of the connection between the axle and the driveshaft.

It is to be understood that both the foregoing general description and the following detailed description are exemplary, but are not restrictive, of the disclosure.

BRIEF DESCRIPTION OF THE DRAWINGS

The characteristics and advantages of the invention appear more clearly from the detailed description of some illustrated embodiments, which are indicative but not exhaustive, with reference to the appended drawings wherein:

FIG. 4a is a front view of the suspension assembly of FIG. 1 in a first inclination condition;

FIG. 4b is a detailed front view of the suspension assembly of FIG. 4a;

FIG. 5a is a front view of the suspension assembly of FIG. 1 in a second inclination condition;

FIG. 5b is a detailed front view of the suspension assembly of FIG. 5a;

DESCRIPTION OF PREFERRED EMBODIMENTS

Figure 1:
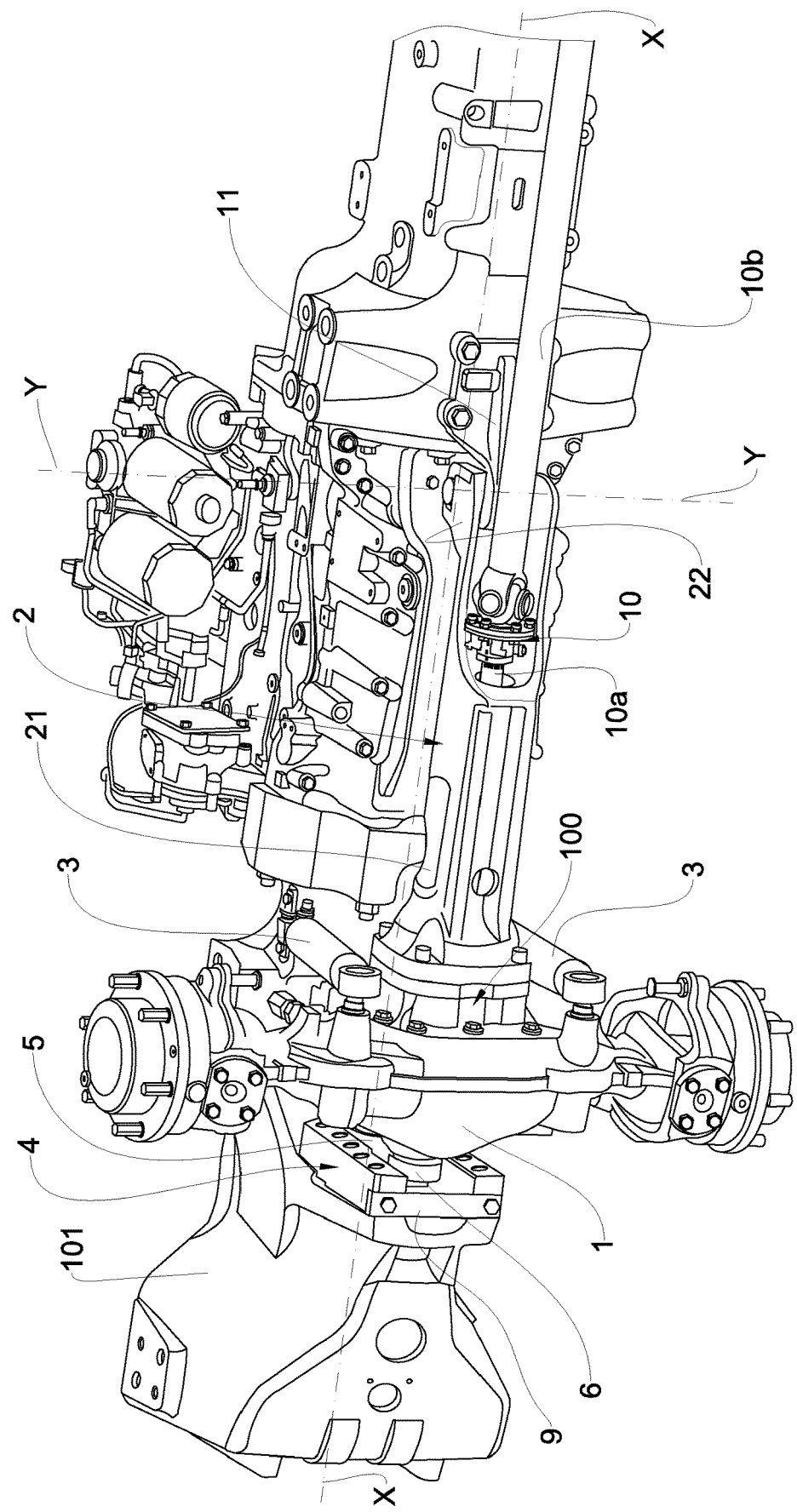
FIG. 1 is a perspective view from below of a suspension assembly produced according to this invention.

With initial reference to FIG. 1, reference number 100 indicates, as a whole, a suspension assembly for a vehicle axle, in particular an agricultural vehicle or other similar vehicle suitable for off-road use.

Preferably, the suspension assembly 100 comprises a support structure 1 for an axle and a housing element 2 for a driveshaft 10.

According to an embodiment shown in FIG. 1, the driveshaft 10 lies in a longitudinal plane of symmetry of the vehicle and it preferably has a feature that is substantially parallel or inclined to the longitudinal axis of the vehicle.

Figure 3:
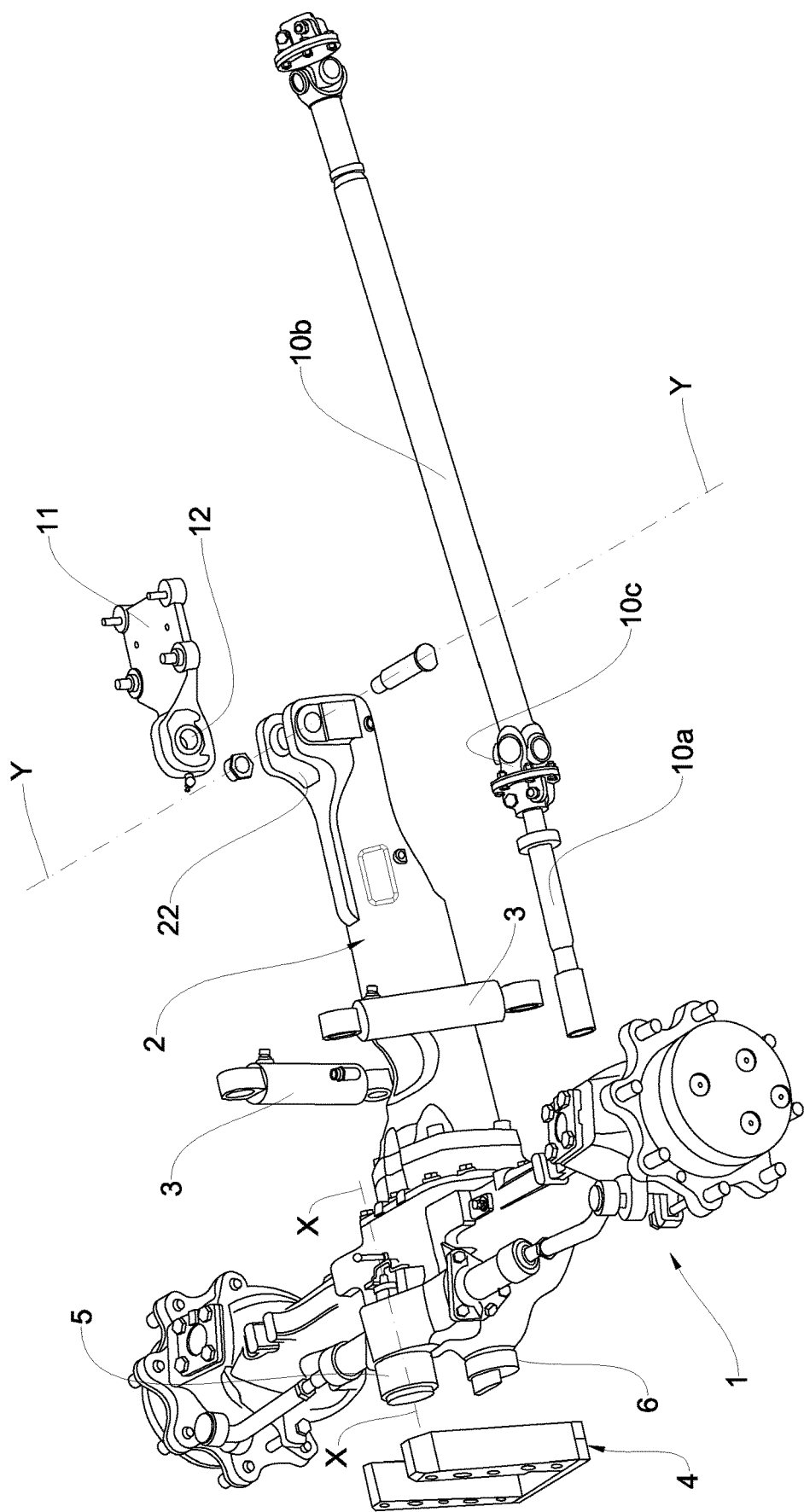
FIG. 3 is a partially exploded perspective view of the suspension assembly of FIG. 1.

With reference to FIG. 3, the driveshaft 10 advantageously comprises two shafts 10a, 10b connected to each other by a universal joint 10c.

Preferably and as shown in FIGS. 1 and 3, the housing element 2 is rotatably connected, about a transverse axis Y, perpendicular to the longitudinal axis of the aforementioned vehicle, to a main chassis 101 of the vehicle, at its first extremity 22.

According to an embodiment, and with reference to FIG. 3, the first extremity 22 has a pair of arms, each one advantageously hinged about the aforementioned transverse axis Y on a support element 11 connected to the main chassis 101.

Preferably, the support structure 1 is rotatably connected to the housing element 2 about a rotational axis X, which likewise lies in a longitudinal plane of symmetry of the vehicle and is substantially parallel or inclined to the driveshaft 10.

According to an embodiment shown in FIG. 3, the housing element 2 is rotatably connected to the support element 11 by a ball joint 12 in order to allow for the rotation about the rotational axis X and the transverse axis Y that is perpendicular to it. This rotational motion will be illustrated in greater detail below.

Figure 2:
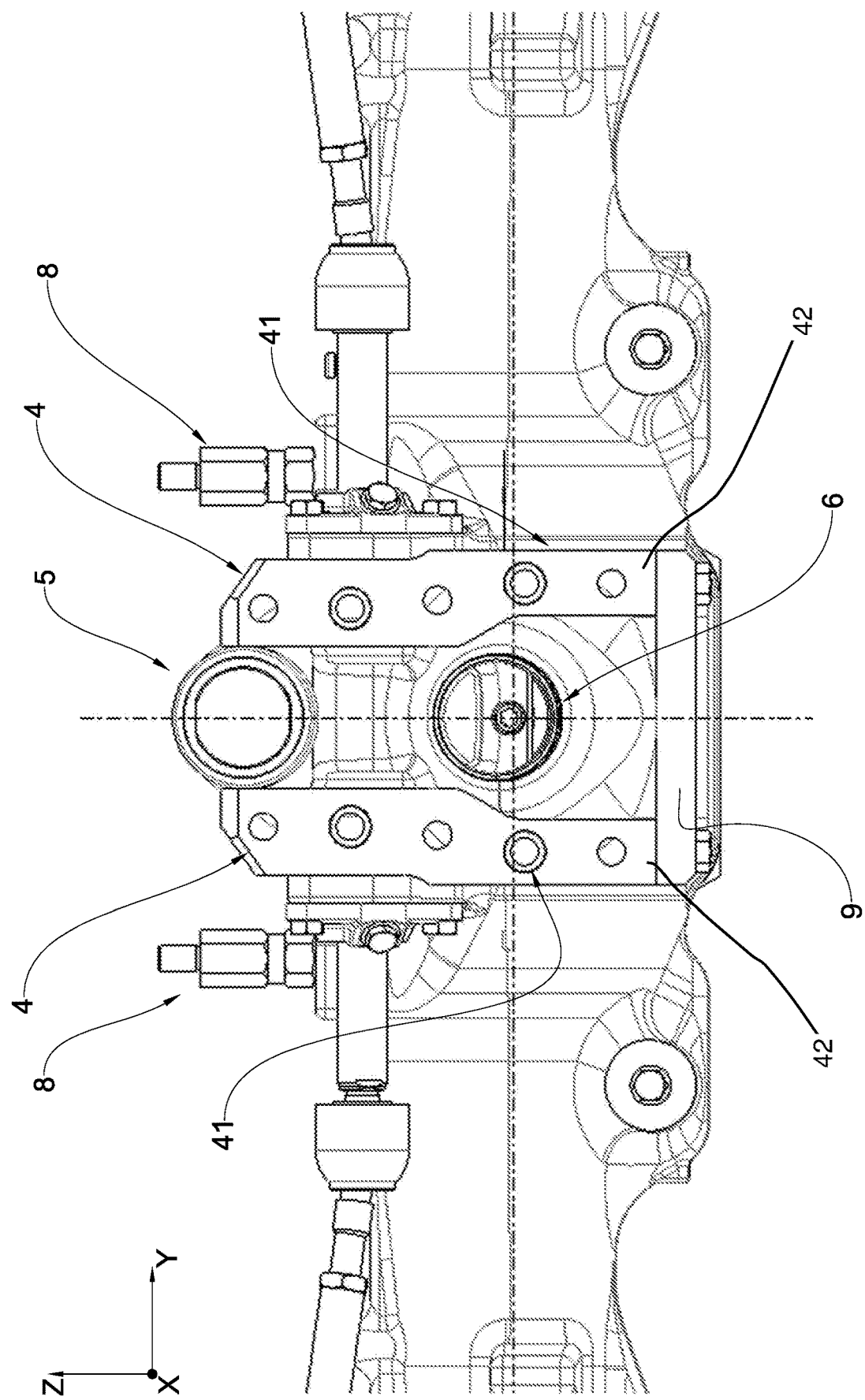
FIG. 2 is a schematic representation of a front view of the suspension assembly of FIG. 1.
Figure 4:
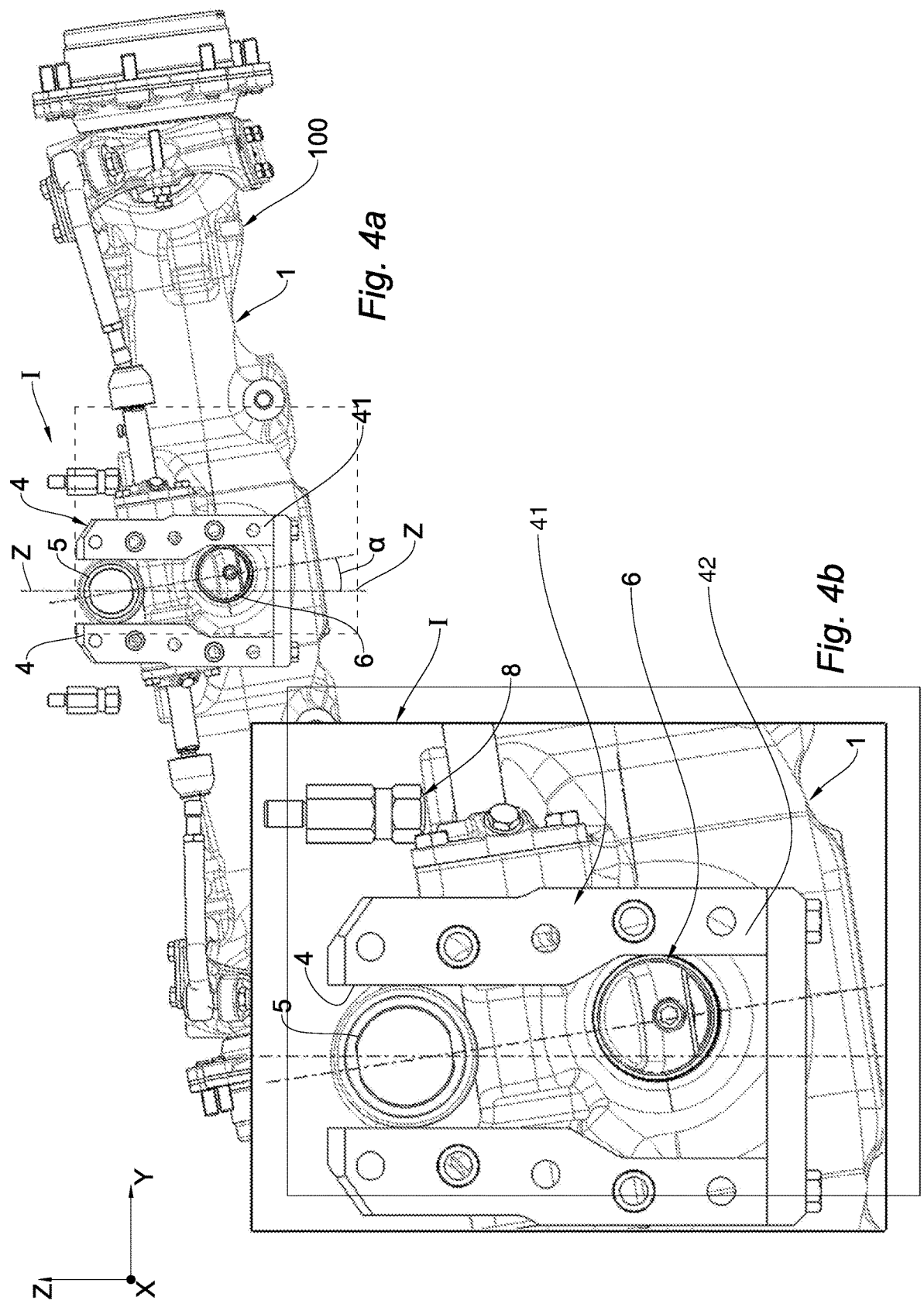
Figure 5:
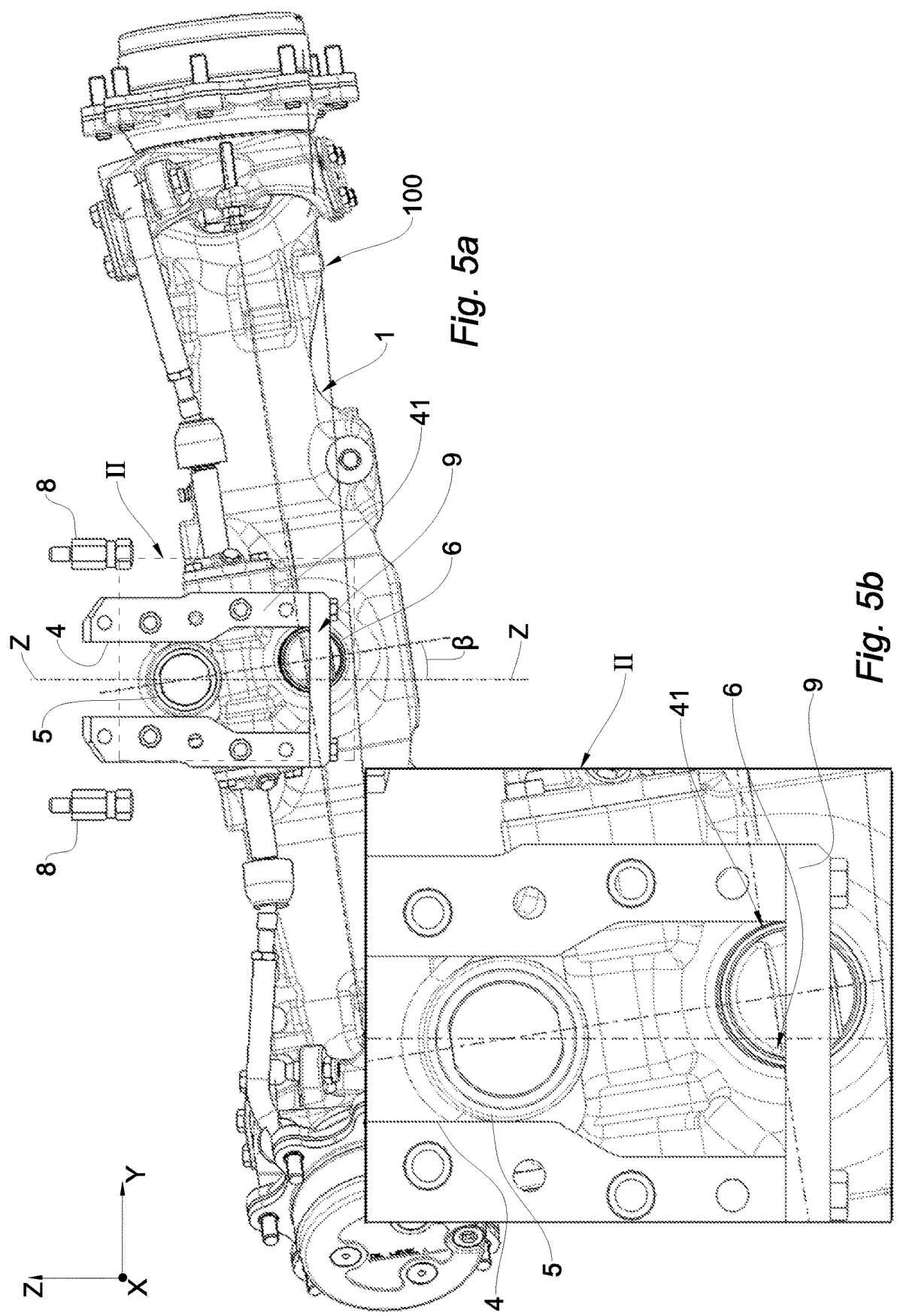

For the purpose of a clearer understanding of the present invention, FIGS. 2, 4a, and 5a show an axial XYZ triplet which represents the spatial orientation of the rotational axis X, of the perpendicular transverse axis Y and of a vertical axis Z perpendicular to both.

As shown in FIGS. 1 and 3, the support structure 1 is secured, according to an embodiment, to the main chassis 101 of the vehicle by a pair of hydraulic cylinders 3.

With reference to FIGS. 2, 4a, and 5a, the support structure 1 comprises, preferably, a pair of main guides 4, which can be fixed onto the main chassis 101 and a rolling element 5 which slides between the pair of main guides 4.

According to an embodiment, the suspension assembly 100 comprises a contact element 6, secured to the support structure 1 and a pair of further guides 41, which can be fixed to the main chassis 101.

Advantageously, the contact element 6 is operationally associated with the pair of further guides 41 in such a manner that it comes into contact with one of the further guides 41 following a rotation about the rolling element 5.

As shown in FIGS. 4a and 5a, when the suspension assembly 100 is rotated, for example, counter clockwise by a predetermined angle about the rotational axis X, the contact element 6 defines an end-of-travel position coming into contact with one of the further guides 41 and thus constraining the motion, at least in relation to one component of the perpendicular transverse axis Y, of the suspension assembly 100 in relation to the main chassis 101 or, in other words, the rotation of the assembly 100 about the vertical axis Z.

Preferably, the main guides 4 and the further guides 41 are straight and, in use, are substantially vertical.

According to a preferred embodiment and with reference to FIGS. 4a and 4b, a first inclination condition I of the support structure 1 in relation to the axial XYZ triplet and to the main guides 4 and the further guides 41 is shown. In this case, the rolling element 5 is secured between the pair of main guides 4, located in correspondence with the maximum upward vertical motion (which is to say, in the direction that corresponds to increasing values of Z) and rotated counter clockwise by a first angle $\alpha$ in relation to the vertical axis Z. Moreover, following the rotation, the contact element 6 comes into contact with one of the further guides 41, thereby defining an end-of-travel position of the suspension assembly 100 in relation to at least one component of the perpendicular transverse axis Y.

According to an embodiment shown in FIG. 2, the rolling element 5 and the contact element 6 are both disc shaped.

As shown in FIGS. 2, 4a, 4b, 5a, and 5b, the further guides 41 have, preferably, a greater distance from one another than the main guides 4. According to the embodiment shown in the aforementioned figures, while the rolling element 5 translates in relation to the vertical axis Z and rotates in relation to the rotational axis X, this distance from one another of the further guides 41 allows the contact element 6 to translate both in relation to the vertical axis Z as well as in relation to the perpendicular transverse axis Y and to rotate in relation to the rotational axis X.

In this manner, the further guides 41 define a boundary for the rotational-translational motion of the contact element 6 and therefore for the suspension assembly 100 secured to it.

According to a preferred embodiment, the further guides 41 extend as extensions of the main guides 4.

Advantageously, each of the further guides 41 and of the main guides 4 is produced in a single piece as shown in FIG. 2 and profiled as needed.

Further preferably, and with reference to FIGS. 2, 4a, 4b, 5a, and 5b, each individual part, which is to say, each part comprising a main guide 4 extending into the further guide 41, includes a connection portion that is inclined in relation to the vertical axis Z and divergent from the vertical axis Z as it moves away from the rolling element 5.

Preferably and with reference to FIG. 2, the contact element 6 is located beneath the rolling element 5 in relation to the rotational axis X of the support structure 1. As can be seen in FIG. 2, when the suspension assembly 100 has zero inclination in relation to the vertical axis Z, or rather, the support structure 1 has zero rotation, the rolling element 5 and the contact element 6 are aligned in relation to the vertical axis Z.

According to an embodiment, the suspension assembly 100 further comprises at least one stop element 8 which can be fixed to the main chassis 101 and configured in such a manner that it comes into contact with the support structure 1 following a vertical motion.

With reference to FIG. 2, the suspension assembly 100 advantageously comprises two stop elements 8. According to an embodiment, the two stop elements 8 are symmetrically located in relation to the rotational axis X. In particular, a condition is shown wherein the suspension assembly 100 is in contact with both stop elements 8. In this condition, the suspension assembly 100 preferably assumes a zero inclination in relation to the vertical axis Z.

Preferably and as shown in FIGS. 1 and 2, the further guides 41 are joined at one of their lower extremities 42 by a reinforcing crossbar 9. The reinforcing crossbar 9 is preferably located in a longitudinal position that is more advanced in relation to the contact element 6. In this manner, the contact element 6 can also move to a position that is vertically below the crossbar 9.

According to an embodiment and with reference to FIGS. 5a and 5b, a second inclination condition II of the support structure 1 is shown, in relation to the axial XYZ triplet and to the main guides 4 and the further guides 41. In this case, the rolling element 5 is secured between the pair of main guides 4 and located in correspondence with the minimum downward vertical motion (which is to say, in the direction corresponding to decreasing values of Z) and rotated counter clockwise by a second angle $\beta$ in relation to the vertical axis Z. Moreover, following the rotation and translation, the contact element 6 comes into contact with one of the further guides 41 and/or the reinforcing crossbar 9, thus determining an end-of-travel position of the suspension assembly 100, at least in relation to a component of the perpendicular transverse axis Y and/or in relation to a component of the vertical axis Z.

According to a preferred embodiment and with reference to FIGS. 1 and 3, the rolling element 5 and the contact element 6 are located at an extremity opposite the housing element 2.

Advantageously, the rolling element 5 and the contact element 6 are located on a side of the support structure 1 that is substantially perpendicular to the rotational X axis of the vehicle.

Figure 6:
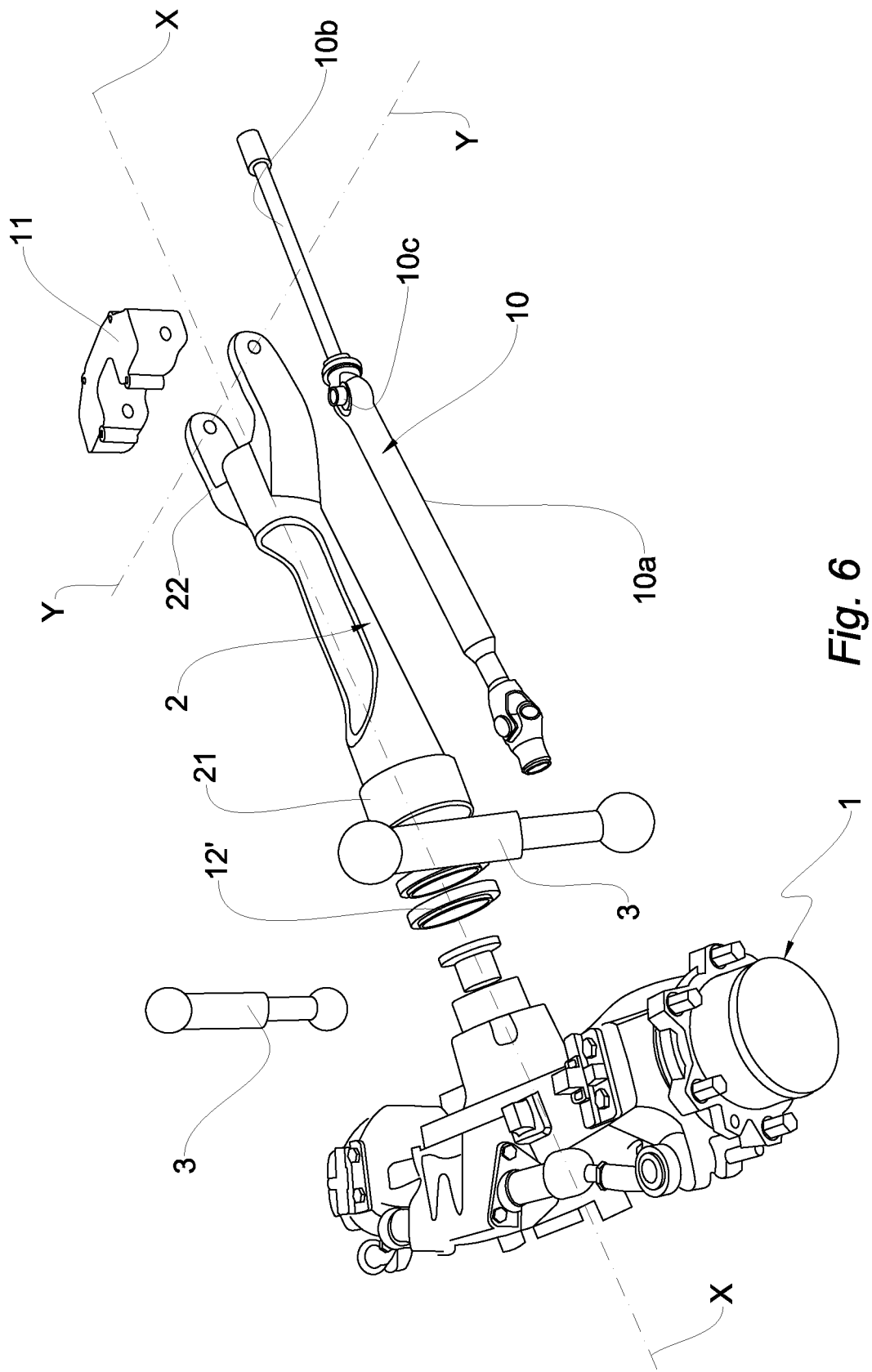
FIG. 6 is a perspective view from below of a suspension assembly produced according to a second embodiment.
Figure 7:
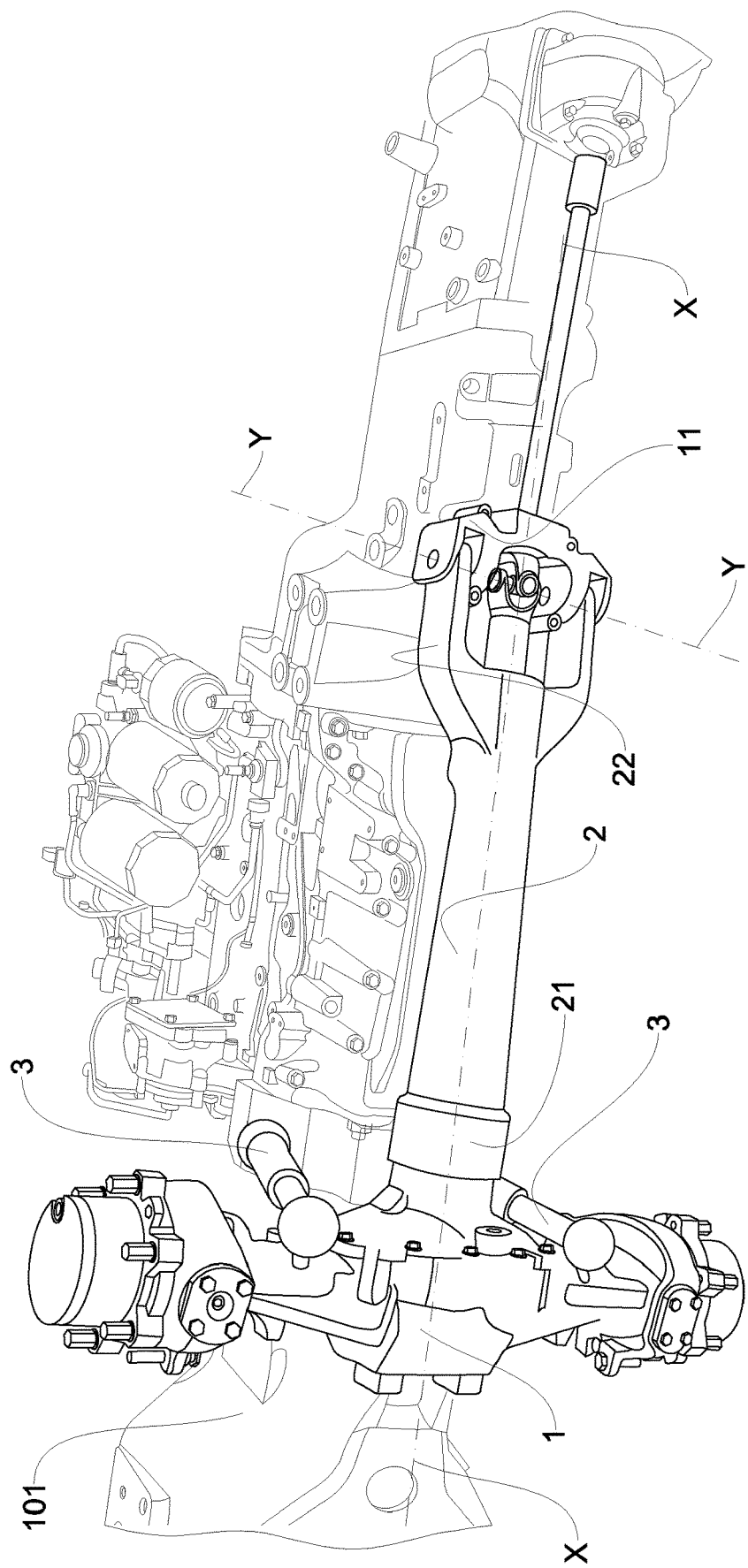
FIG. 7 is a partially exploded perspective view of the suspension assembly of FIG. 6.

With reference to FIGS. 6 and 7, in an alternative embodiment, the housing element 2 is rotatably connected to the support structure 1 by a bearing 12' at an extremity 21 which is opposite to that connected to the support element 11.

According to a preferred embodiment, the first extremity 22 is C-shaped and each arm of the first extremity 22 is advantageously hinged on a respective location of the support element 11. This connection allows the housing element 2 to rotate about the transverse axis Y.

The rotational capability of the support structure 1 about the rotational axis X is instead obtained by the bearing 12'. It will therefore be appreciated that the rotational axis X substantially coincides with the shaft 10a, and is therefore not necessarily parallel to a horizontal plane.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure.

The invention claimed is:

1. A suspension assembly for a vehicle axle of a vehicle being suitable for off-road use and having a main chassis and a longitudinal axis, the suspension assembly comprising:
  a support element connected to the main chassis of the vehicle;
  a support structure for the axle, the support structure having a pair of main guides fixed to the main chassis and a disc shaped rolling element which slides between the pair of main guides, wherein the support structure is configured to rotate relative to the support element about a rotational axis;
  a pair of hydraulic cylinders securing the support structure to the main chassis;
  a housing element for a driveshaft, the housing element being rotatably connected, about a transverse axis that is substantially perpendicular to the longitudinal axis of the vehicle, to the support element;
  a pair of further guides affixed to the main chassis; and
  a disc shaped contact element secured to the support structure and located between the pair of further guides and operatively connected to the pair of further guides so as to come into contact with one of the further guides following a rotation about the rolling element.

2. The suspension assembly according to claim 1, wherein the main guides and the further guides are straight and are, in use, substantially vertical.

3. The suspension assembly according to claim 1, wherein the rolling element and the contact element have the same diameter.

4. The suspension assembly according to claim 1, wherein the main guides have a distance between each other and the further guides have a distance between each other that is greater than the distance between the main guides.

5. The suspension assembly according to claim 1, wherein the further guides extend as extensions of the main guides.

6. The suspension assembly according to claim 1, further comprising at least one stop element fixed to the main chassis and configured to contact the support structure following a vertical motion.

7. The suspension assembly according to claim 1, further comprising a reinforcing crossbar and wherein the further guides have lower extremities and are joined at one of their lower extremities by the reinforcing crossbar.

8. The suspension assembly according to claim 1, further comprising an extremity opposite to the housing element and wherein the rolling element and the contact element are located at the extremity that is opposite to the housing element.

9. The suspension assembly according to claim 1, wherein each of the further guides and the main guides is formed as a single part.

10. The suspension assembly according to claim 9, further having a vertical axis and wherein the single part forming each of the further guides and the main guides includes a connection portion that is inclined in relation to the vertical axis and divergent from the vertical axis as the connection portion moves away from the rolling element, the connection portion being located between the further guide and the main guide.

11. The suspension assembly according to claim 1, further having a vertical axis and wherein, when the support structure has zero rotation, the rolling element and the contact element are aligned in relation to the vertical axis.

12. The suspension assembly according to claim 1, further comprising a ball joint and wherein the housing element is connected to the support element by the ball joint.

13. The suspension assembly according to claim 1, further comprising a bearing and wherein the housing element has extremities and is hinged to the support element at one of the extremities of the housing element and is rotatably connected to the support structure by the bearing at one of the opposite extremities of the housing element.

14. A suspension assembly for a vehicle axle of a vehicle being suitable for off-road use and having a main chassis and a longitudinal axis, the suspension assembly comprising:
  a support element connected to the main chassis of the vehicle;
  a support structure for the axle, the support structure having a pair of main guides fixed to the main chassis and a rolling element which slides between the pair of main guides, wherein the support structure is configured to rotate relative to the support element about a rotational axis;
  a pair of hydraulic cylinders securing the support structure to the main chassis;
  a housing element for a driveshaft, the housing element being rotatably connected, about a traverse axis that is substantially perpendicular to the longitudinal axis of the vehicle, to the support element;
  a pair of further guides affixed to the main chassis; and
  a contact element secured to the support structure and located between the pair of further guides and operatively connected to the pair of further guides so as to come into contact with one of the further guides following a rotation about the rolling element, wherein the contact element is located beneath the rolling element in relation to the rotational axis.

15. A suspension assembly for a vehicle axle of a vehicle being suitable for off-road use and having a main chassis and a longitudinal axis, the suspension assembly comprising:
  a support element connected to the main chassis of the vehicle;
  a support structure for the axle, the support structure having a pair of main guides fixed to the main chassis with a distance between the main guides and a rolling element which slides between the pair of main guides, wherein the support structure is configured to rotate relative to the support element about a rotational axis;
  a pair of hydraulic cylinders securing the support structure to the main chassis;
  a housing element for a driveshaft, the housing element being rotatably connected, about a transverse axis that is substantially perpendicular to the longitudinal axis of the vehicle, to the support element;
  a pair of further guides affixed to the main chassis and extending as extensions of the main guides, the further guides having a distance between each other that is greater than the distance between the main guides;
  a contact element secured to the support structure and located between the pair of further guides and operatively connected to the pair of further guides so as to come into contact with one of the further guides following a rotation about the rolling element;
  at least one stop element fixed to the main chassis and configured to contact the support structure following a vertical motion; and a reinforcing crossbar wherein the further guides have lower extremities and are joined at one of their lower extremities by the reinforcing crossbar.

16. The suspension assembly according to claim 15 wherein the main guides and the further guides are straight and are, in use, substantially vertical.

17. The suspension assembly according to claim 15 wherein the rolling element and the contact element are both disc shaped and have the same diameter.

18. The suspension assembly according to claim 15 wherein the contact element is located beneath the rolling element in relation to the rotational axis.

19. A suspension assembly for a vehicle axle of a vehicle being suitable for off-road use and having a main chassis and a longitudinal axis, the suspension assembly comprising:
   a support element connected to the main chassis of the vehicle;
   a support structure for the axle, the support structure having a pair of main guides fixed to the main chassis with a distance between the main guides and a rolling element which slides between the pair of main guides, wherein the support structure is configured to rotate relative to the support element about a rotational axis;
   a pair of hydraulic cylinders securing the support structure to the main chassis;
   a housing element for a driveshaft, the housing element being rotatably connected, about a transverse axis that is substantially perpendicular to the longitudinal axis of the vehicle, to the support element;
   a pair of further guides affixed to the main chassis and extending as extensions of the main guides, the main guides and the further guides being straight and substantially vertical in use, the further guides having a distance between each other that is greater than the distance between the main guides;
   a contact element secured to the support structure and located between the pair of further guides and operatively connected to the pair of further guides so as to come into contact with one of the further guides following a rotation about the rolling element, wherein the rolling element and the contact element are both disc shaped and have the same diameter and the contact element is located beneath the rolling element in relation to the rotational axis;
   at least one stop element fixed to the main chassis and configured to contact the support structure following a vertical motion; and
   a reinforcing crossbar wherein the further guides have lower extremities and are joined at one of their lower extremities by the reinforcing crossbar.

* * * * *